(12) United States Patent
Park et al.

(10) Patent No.: US 6,185,932 B1
(45) Date of Patent: Feb. 13, 2001

(54) QUICK-HEATING CATALYTIC CONVERTER

(76) Inventors: Sea C. Park; In P. Park, both of 3836 Birchwood, Skokie, IL (US) 60076

( * ) Notice: Under 35 U.S.C. 154(b), the term of this patent shall be extended for 0 days.

(21) Appl. No.: 09/359,140

(22) Filed: Jul. 23, 1999

(51) Int. Cl.$^7$ ....................................................... F01N 3/00
(52) U.S. Cl. .................................. 60/284; 60/277; 60/278; 60/275
(58) Field of Search ............................... 60/277, 284, 278, 60/275

(56) References Cited

U.S. PATENT DOCUMENTS

| | | | |
|---|---|---|---|
| 4,891,939 | * | 1/1990 | Brighenti ................................. 60/278 |
| 5,195,317 | * | 3/1993 | Tomotaka et al. ....................... 60/275 |
| 5,503,804 | * | 4/1996 | Fujishita et al. ......................... 60/284 |
| 5,966,931 | * | 10/1999 | Yoshizaki et al. ....................... 60/284 |
| 6,003,304 | * | 12/1999 | Swanson et al. ........................ 60/284 |
| 6,050,086 | * | 4/2000 | Ishizuka et al. ......................... 60/284 |

FOREIGN PATENT DOCUMENTS

| | | | | |
|---|---|---|---|---|
| 000221805A1 | * | 5/1987 | (EP) ........................................ 60/275 |
| 361011416 | * | 1/1986 | (JP) ......................................... 60/275 |
| 4-04017712 | * | 1/1992 | (JP) ......................................... 60/275 |

\* cited by examiner

*Primary Examiner*—Thomas Denion
*Assistant Examiner*—Thai-Ba Trieu
(74) *Attorney, Agent, or Firm*—Dykema Gossett PLLC

(57) ABSTRACT

Disclosed is a quick-heating catalytic converter which allows the reduction of the unwanted emissions or pollutants created by the operation of an internal combustion engine. It comprises a catalytic converter system and an electronic heating catalytic system. In the catalytic converter system, the exhaust created by the operation of an internal combustion engine is oxidized or reduced to harmless emissions in the presence of a catalyst. The electronic heating catalytic converter system is located at a front position of the catalytic converter system and preheats the exhaust, comprising a power inverter circuit for inverting a direct current into an alternating current, a temperature-controlling circuit for controlling the temperature of the catalytic converter system, and a quick microwave heating circuit for quickly increasing the temperature of the catalytic converter within a few seconds to such an extent that the catalyst can readily function to purify the exhaust. The quick-heating catalytic converter allows the exhaust generated just after engine starting to be heated to the temperatures sufficient for the catalyst to function optimally within seconds, thereby safely purifying all of the emissions from cars.

8 Claims, 8 Drawing Sheets

QUICK-HEATING CATALYTIC CONVERTER

CROSS REFERENCE TO RELATED APPLICATIONS

This application is related to Korean application Ser. No. 94-023058 entitled "Automobile Emission Control System" filed Sep. 13, 1994, now Korean Pat. No. 109722, which is hereby incorporated by reference.

BACKGROUND OF THE INVENTION

1. Field of the invention

The present invention relates, in general, to the field of catalysis for the reduction of emissions from internal combustion engines and, more particularly, to a quick-heating catalytic converter, which enables the exhaust generated immediately after engine starting to be heated to the temperature sufficient for the catalyst to function optimally within seconds.

2. Description of the Prior Art

As long as vehicles, such as passenger cars, autotrucks and the like, burn petrochemical products to produce drive power, exhaust gases are generated, which generally contain pollutants as a consequence of the combustion in the internal engines. With recent advances in the controlling apparatuses of exhaust gases, most of the pollutants can be converted into harmless materials, generally $CO_2$ and $H_2O$, prior to emission from a tail pipe of a muffler.

An apparatus for controlling exhaust gases is a complex assembly consisting of mechanical and electronic parts, which are designed to function to neutralize exhaust gases in concert with each other, thereby reducing the harmful pollutants contained therein. Of them, a catalytic converter is the most well known, which takes advantage of a catalyst, which alters the velocity of the chemical reaction and may be recovered essentially unaltered in form and amount at the end of the reaction.

Most of the unacceptable emissions or pollutants created by internal combustion engines equipped with catalytic converters occur during cold start operations. These pollutants are emitted in the first five minutes after cold engine starting.

As the governmental requirements of the U.S.A. regarding acceptable emission levels become more strict, research of vehicle manufacturers has been and continues to be directed to the development of various fuels which do not produce unacceptable emissions or pollutants.

As a result, electric vehicles were developed, and hydrogen, natural gas, methanol, ethanol and reformulated gas are used as fuels or taken into consideration. However, all of them suffer from drawbacks. For example, electric vehicles themselves are completely pollution-free, but if all of the currently used cars were required to be electrically charged for fueling, the capacity of the current power plants would be increased twice, resulting in aggravation of pollution to the same extent. Another disadvantage of electric vehicles is that it takes too much time to electrically charge them when the existing electric stored energy is not sufficient. Usually, the current electric vehicles should be recharged with electric energy after a use of 1 to 2 hours and the recharging time is too long. Taking these problems into account, world-wide prominent vehicle manufacturers, including the GM company, have invested an enormous amount of money, but the vehicles developed thus far are found not to overcome the above-mentioned problems completely.

In all consideration, gasoline vehicles are thought to be the most economical and convenient, if they are improved in pollution production, because they have been familiar to users for approximately one hundred years.

As mentioned above, the most problematic in the production of pollutants by internal combustion engines is a period of the first five minutes after starting the engine. During this period, the exhaust gas is not controlled by catalytic converters. On the other hand, once the vehicles are driven for an extended period of time, greater than 5 min, the inside of the combustion engines reaches a temperature of about 1,000° C. and the tail pipes of mufflers, from which the exhaust gas is emitted, are heated to about 650–800° C.

At least as high as about 1,000° C. is needed to convert carbon monoxide (CO) into carbon dioxide ($CO_2$) in the air. The reduction of the temperature with the aid of catalysts is the essence of the catalytic converter techniques of which automobile manufacturers make a current study. Indeed, the temperature at which the neutralization of carbon monoxide into carbon dioxide in the air occurs, can be reduced to 190° C. when copper-based catalysts (sometimes added with chrome) are used.

The predominant emission-controlling techniques in use by the automobile manufacturers are three-way catalytic converters which have been developed from two-way catalytic converters in order to neutralize nitrogen oxides ($NO_x$).

The automobiles equipped with the three-way converters may be said to be almost pollution-free. However, because, from the year 2002, there will be enacted an anti-pollution law which prescribes the automobiles should be completely pollution-free, various alternatives are now being developed by automobile manufacturers.

In present, the control and suppression of unwanted emissions created by the operation of an internal combustion engine follows the technique which Corning of the GM company developed. As high as 96% of the pollutants contained in emissions can be removed by use of the catalytic converter of Corning. The reason why the pollutants or unwanted emissions cannot be removed completely is that the exhaust gas created immediately after engine starting has a temperature of 52° C. (126° F.) or less at which the catalyst cannot function chemically.

SUMMARY OF THE INVENTION

Therefore, it is an object of the present invention to overcome the above problems encountered in prior arts and to provide a quick-heating catalytic converter which allows the exhaust generated just after engine starting to be heated to the temperatures sufficient for the catalyst to function optimally within seconds, thereby safely purifying all of the emissions from cars.

In accordance with the present invention, the above object could be accomplished by a provision of a quick-heating catalytic converter, comprising: a catalytic converter system in which exhaust created by the operation of an internal combustion engine is oxidized or reduced to harmless emissions in the presence of a catalyst; and an electronic heating catalytic converter system which is located at a front position of the catalytic converter system and preheats the exhaust, comprising: a power inverter circuit for inverting a direct current into an alternating current; a temperature-controlling circuit for controlling the temperature of the catalytic converter system; and a quick microwave heating circuit for quickly increasing the temperature of the catalytic converter within a few seconds to such an extent that the catalyst can readily function to purify the exhaust.

BRIEF DESCRIPTION OF THE DRAWINGS

The above and other objects and aspects of the invention will become apparent from the following description of embodiments with reference to the accompanying drawings in which.

DETAILED DESCRIPTION OF THE PREFERRED EMBODIMENTS

Figure 1:
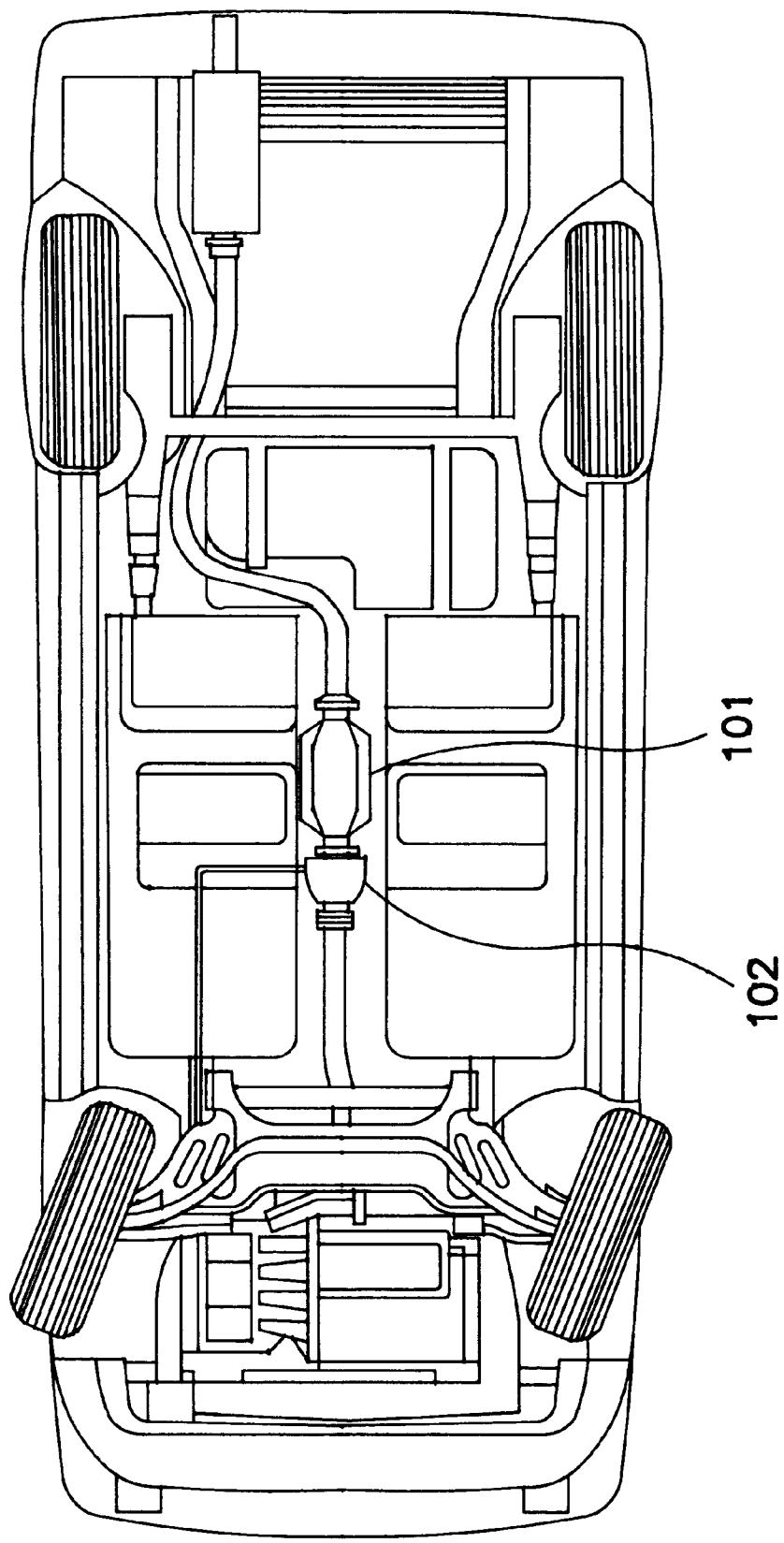
FIG. 1 is a schematic view illustrating the underside structure of a vehicle equipped with a conventional apparatus for the purification of exhaust.

The application of the preferred embodiments of the present invention is best understood with reference to the accompanying drawings, wherein like reference numerals are used for like and corresponding parts, respectively.

Referring to FIG. 1, there is shown a bottom structure of an automobile equipped with a conventional apparatus for purifying exhaust gas. The apparatus consists typically of a catalytic converter 101 which purifies exhaust gas created by the operation of an internal combustion engine to reduce the harmful pollutants contained therein by use of a catalyst, and an electronic heating system 102 attached to the front end of the catalytic converter 101, which heats up the catalyst by use of a battery and an electric circuit.

Figure 2:
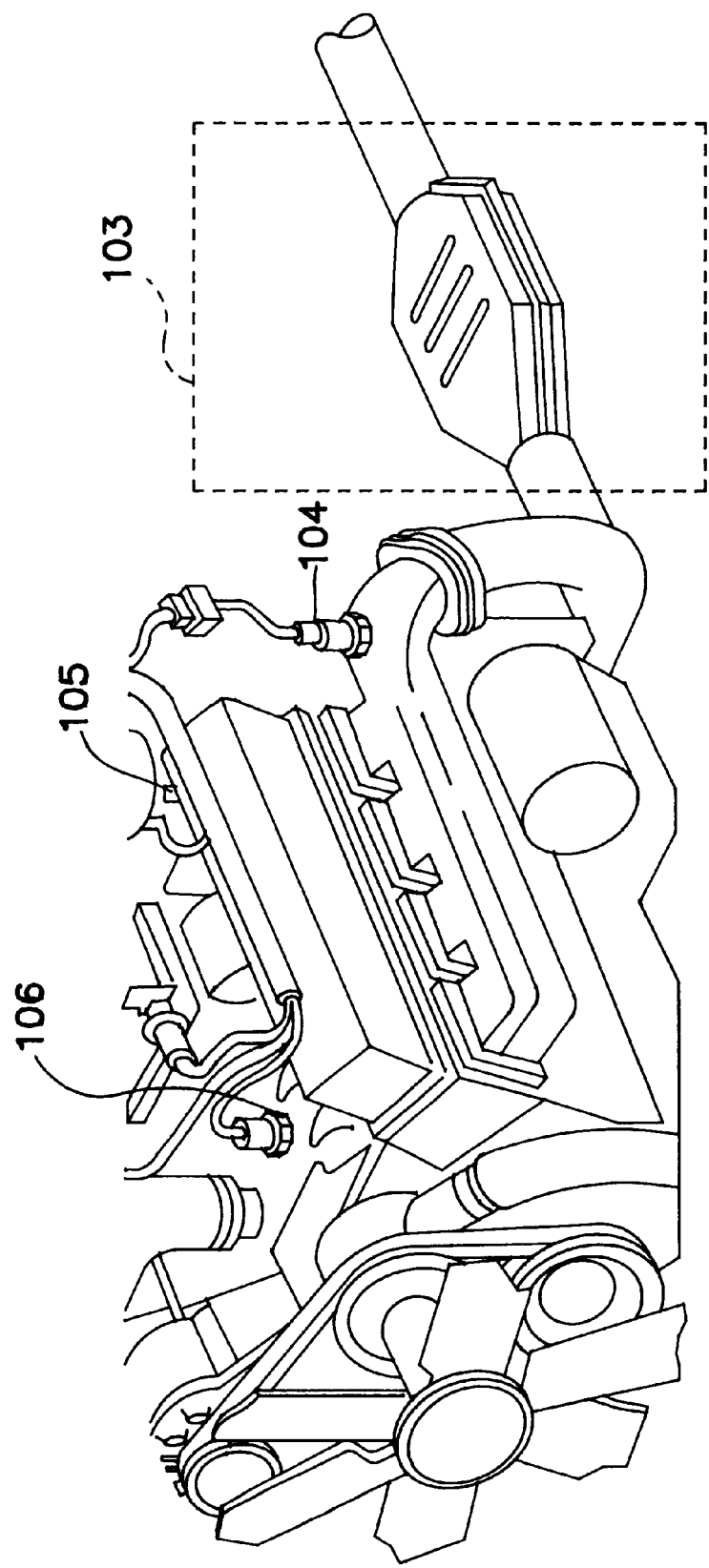
FIG. 2 is a perspective view showing a vehicle manifold equipped with an apparatus for the purification of exhaust, according to the present invention.

Referring to FIG. 2, there is a perspective view showing a manifold equipped with a quick-heating catalytic converter 103 according to the present invention. As shown in this figure, the quick-heating catalytic converter 103 consists of a single integrated module, which is convenient to apply for a newly manufactured vehicle. In contrast, the conventional purifying apparatus is composed of two modules, the catalytic converter 101 and the electronic heating system 102, which are separately mounted on a vehicle, as shown in FIG. 1.

The quick-heating catalytic converter functions according to the control of the signals provided from an oxygen sensor for detecting an oxygen content of the exhaust so as to provide an oxidation atmosphere for effective catalysis before the engine is warmed up, an engine PRM sensor for detecting a flow of air and a current, the air being introduced under the influence of the electric signal from the oxygen sensor, and a cooling water sensor for detecting a content of cooling water before engine starting.

Figure 3:
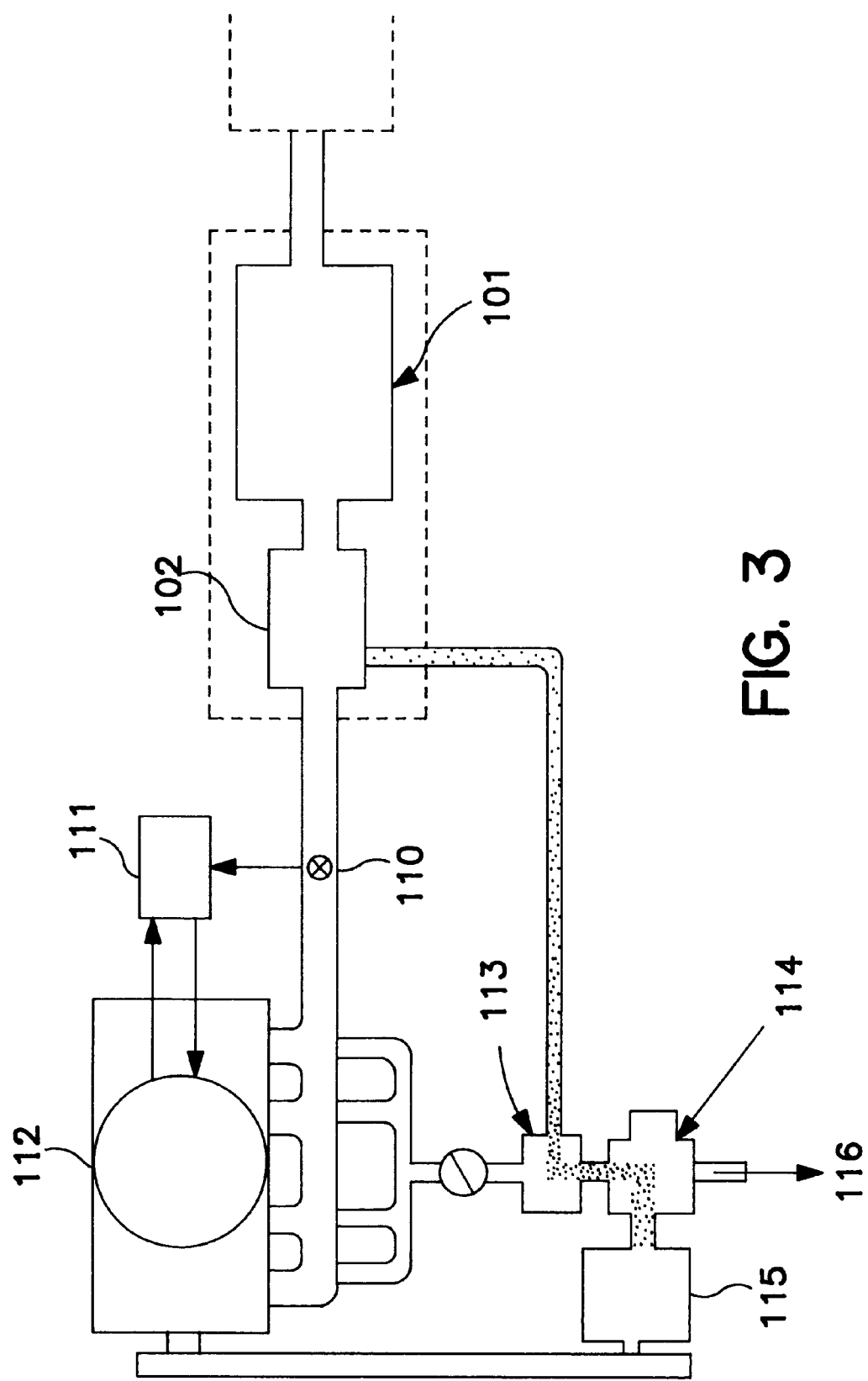
FIG. 3 is a diagram showing the flow of air which is bypassed into an air filter in connection with an electronic heating catalytic converter according to the present invention.

With reference to FIG. 3, there is a diagram showing the flow of air which is bypassed into an air filter in connection with an electronic heating catalytic converter according to the present invention. An air injection system is used to reduce the amounts of hydrocarbons and CO emitted through an exhaust gas system.

Air is supplied to hot exhaust gas to enhance the oxidation of the exhaust gas before it escapes from an exhaust gas system. In addition, the system of the present invention is designed to inject air to the inside of a catalytic converter.

During a cooling operation, the air from a pump 115 is flowed to an exhaust pipe 122 to reduce the hydrocarbons and carbon monoxide of exhaust gas 124 as well as its total amount.

In conventional techniques, after the engine is heated up, the air may be directed to the catalytic converter 101 to provide an oxidation atmosphere for effective catalytic operations. In contrast, the air may be fed to the catalytic converter 101 before the heating of the engine, in order to provide an oxidation atmosphere for effective catalytic operations, in accordance with the present invention.

Figure 4:
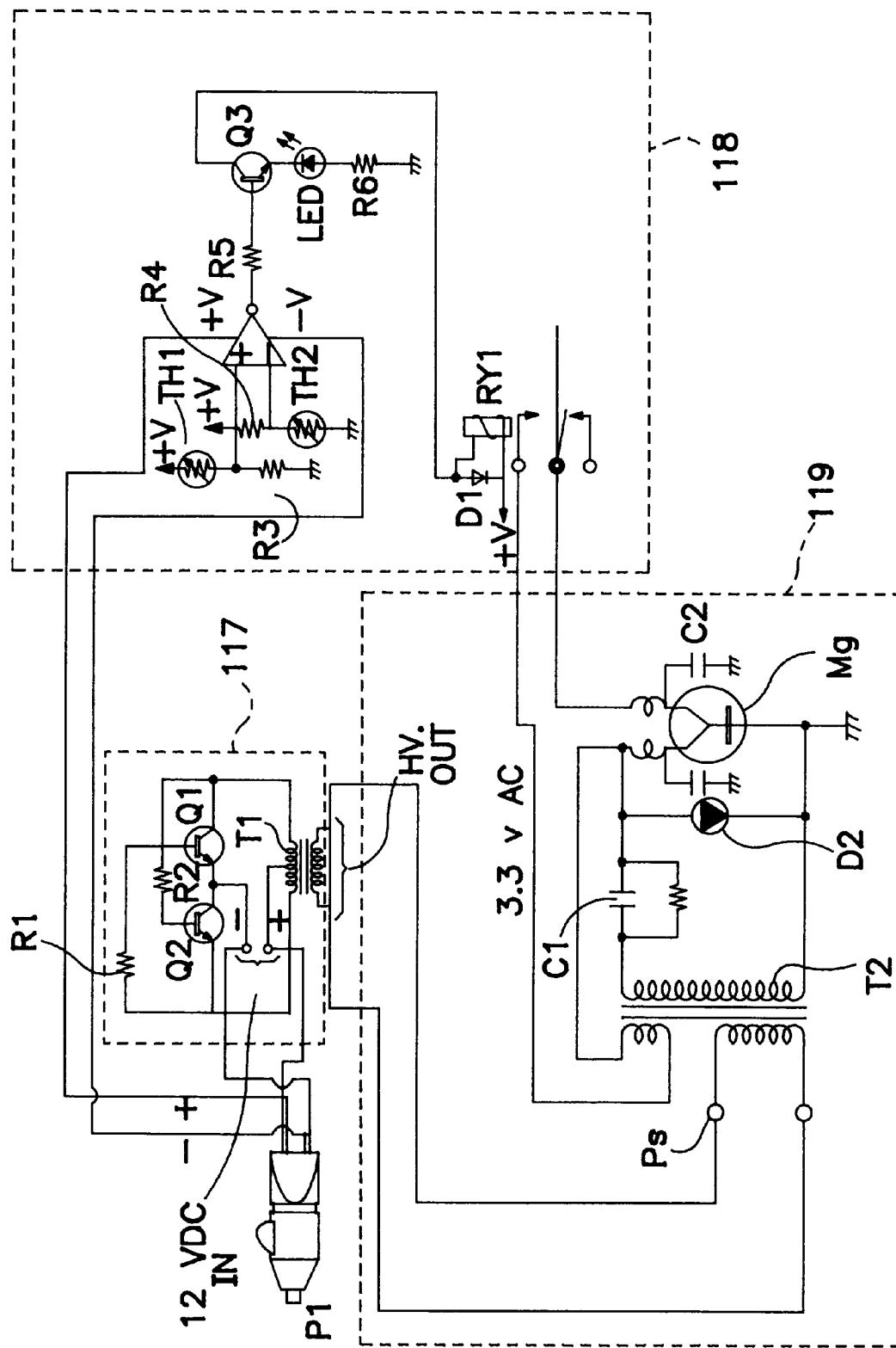
FIG. 4 is a circuit diagram showing the control and suppression of exhaust from a vehicle, in accordance with the present invention.

With reference to FIG. 4, there is shown a circuit diagram for controlling exhaust gas from a vehicle, in accordance with the present invention. As shown in this diagram, this circuit is composed of a power inverter circuit 117 for inverting a direct current into an alternating current, a temperature-controlling circuit 118 for controlling the temperature of the catalytic converter inside the electronic heating catalytic converter, and a quick microwave heating circuit 119 for quickly increasing the temperature of the catalytic converter to such an extent that the catalyst can readily function to purify the exhaust gas.

Turning to the signal process of the circuit, a direct current from a cigarette lighter socket adaptor or a battery is inverted through an inverter corresponding to the circuit 117 into an alternating current and flows to the temperature-controlling circuit 118. This circuit 118 automatically changes from an "ON" state when the temperature of the catalytic converter is below 52° C. to an "OFF" state when the temperature reaches 190° C. or a level which is predetermined if necessary, and vice versa.

Aiming to controlling the temperature of the catalytic converter inside the electronic heating catalytic converter, the circuit 118 comprises an OP amplifier as a reference in which a second thermistor TH2 and a fourth resistance R4 are set to have the same resistance value at 56° C. In this circuit, a third resistance R3 and a first thermistor TH1 form a potential divider which provides a potential to a non-inverting input of the OP amplifier. Being located inside the catalyst, the resistor and the first thermistor TH1 are set to have the same resistance value when the catalyst is heated to 195° C.

An output of the OP amplifier serves to control a first transistor TR1 consisting of a transistor switch. Where a logic output of the OP amplifier is in a high state, the first transistor TR1 enters an "ON" state, providing energy to a first relay RY1.

The relay has a contact which is wired in such a way that, when an "OFF" state occurs owing to no provision of energy to the relay, a heating means for the catalyst is in an "ON" state. If energy is provided to the relay, when the first transistor TR1 is electrically conducted, that is, when the first transistor TR1 is in an "ON" state, a first indicating element LED 1 lights, indicating an "OFF" state of the heating means, that is, a provision of energy to the relay.

In an operational aspect, as the temperature of the cold side is elevated, the second thermistor TH2 is of higher resistance. The higher the resistance of the second thermistor TH2 is, the higher the potential is provided to the inverting input of the OP amplifier. On the other hand, as the hot side is increased in temperature, the first thermistor TH1 becomes highly resistant while the potential applied to the non-inverting input of the OP amplifier is decreased.

As an example for best understanding the operating principle of the circuit, there is the case in which the OP amplifier has the same potential for the non-inverting input and the inverting input when the hot side and the cold side have temperatures of 160° C. and 25° C., respectively.

As the hot side is heated, the potential of the non-inverting input becomes larger than that of the inverting input. In this case, of course, the logic input of the OP amplifier is in a high state, leading to a provision of an energy to the relay. The provision of energy to the relay makes the heating means for the hot side be in an "OFF" state. Inversely, when the hot side is cooled to 160° C. or lower, the OP amplifier has a logic output which is in a low state, so that the energy provision to the relay cannot be proceeded further. In result, the heating means for the hot side is turned on.

While determining the ON/OFF points of the hot side, the potentials applied to the inverting input of the OP amplifier are dependent on external temperatures.

Corresponding to the quick microwave heating circuit 119, an electronic heating device is designed to raise the temperature of the catalyst within a few seconds by microwaving. As seen in this circuit, power is applied to a magnetron tube Mg after energy is provided to a switch and other parts.

The magnetron tube Mg is located inside a catalytic converter T2 and irradiates a radio frequency (hereinafter referred to as "rf") which can heat the catalytic converter within a period of several seconds to several seconds.

Showing the same properties as those of optical waves, microwaves, a kind of electromagnetic wave, are similar to light, radiowaves, and thermal waves. Microwaves have behaviors of going straight ahead and being transmitted, reflected and absorbed.

Therefore, the microwaves generated by the magnetron tube Mg are transmitted to the catalytic converter T2, reflected within the internal space of the catalytic converter T2 and absorbed to the exhaust gas.

The microwave has a wavelength of 5 inches or less which is shorter compared to those of light, corresponding to a frequency of $2,450 \times 10^6$ cycles. In order to operate microwaves, the Federal communication commission allocated three frequency bands: 915 MHz, 2,450 MHz, and 5,500 MHz. The equipment is operated at 2,450 MHz.

When a water-containing material is exposed to microwaves, it is heated. In other words, the magnetron tube Mg produces a thermal energy in a microwave form and the water-containing material absorbs the energy. While the microwave alternates polarities every half cycle, the water molecules oscillate and rub against adjacent ones. The friction between water molecules results in converting the microwave energy into heat.

Microwaves can be reflected in the same manner as that of light and penetrate through substances such as glass, ceramics, paper, plastics and the like. Whereas aluminum foil and stainless steel reflect microwaves, ordinary steel can absorb them in part. Water absorbs microwaves and is heated to a boiling state.

In the circuit 119, a cathode is located at the center of the magnetron, corresponding to a filament which emits electrons when being heated. This cathode is connected to a cathode of a power supply which is applied with a potential of about 4,000 volts against an anode of the power supply. The 4,000 volts are generated by the doubler action which is elicited from a high-voltage transformer, a capacitor and a diode.

As well known, electrons, negatively charged, are strongly repulsed from a negative cathode, but attracted by a positive anode. If the potential of 4,000 volts is the sole force which has influence on the inside of the magnetron, the electrons move straightly from the cathode to an anode. Actually, the magnetron has a diode form in which a magnetic field is applied across the cathode and the anode by use of two permanent magnets. If a magnetic field with a sufficient intensity is applied across the cathode and the anode, the electrons follow the course almost perpendicular to the previous one, showing circular traces around the anode. Finally, the electrons reach the anode.

This circular movement of the electrons induces alternating currents in the gap of the anode. When the electrons approach one of a plurality of segments which exist between two gaps, positive charges are introduced inside the segment. This induction procedure of alternating currents within the gaps of the anode is regarded as lumping along with a resonant circuit.

While the magnetron is operated, the electrons go round the anode and gather together, forming a pattern of a spoked wheel by the influence of the force attributed to the high voltage and the potent magnetic field. A crowd of electrons, which have a much more potent energy than does a single electron, revolves around the anode and finally reaches the gap, forming a continuous resonant circuit. The high-frequency energy created inside the resonant circuit is extracted through an antenna and transferred through a waveguide to the inside of the catalytic converter.

In the microwave heating circuit exist four fundamental different circuits. A low-voltage circuit is composed of all parts which are under influence of a power line. In the meanwhile, high-voltage (hv) components are located in the range from the hv transformer T2 to the magnetron circuit. The low-voltage circuit comprises all parts which lie in a range from the power line cord to a primary winding of the hv transformer. The parts must work to provide the power line voltage (117 to 120 Vac) to the transformer, in cooperation with each other.

Figure 5:
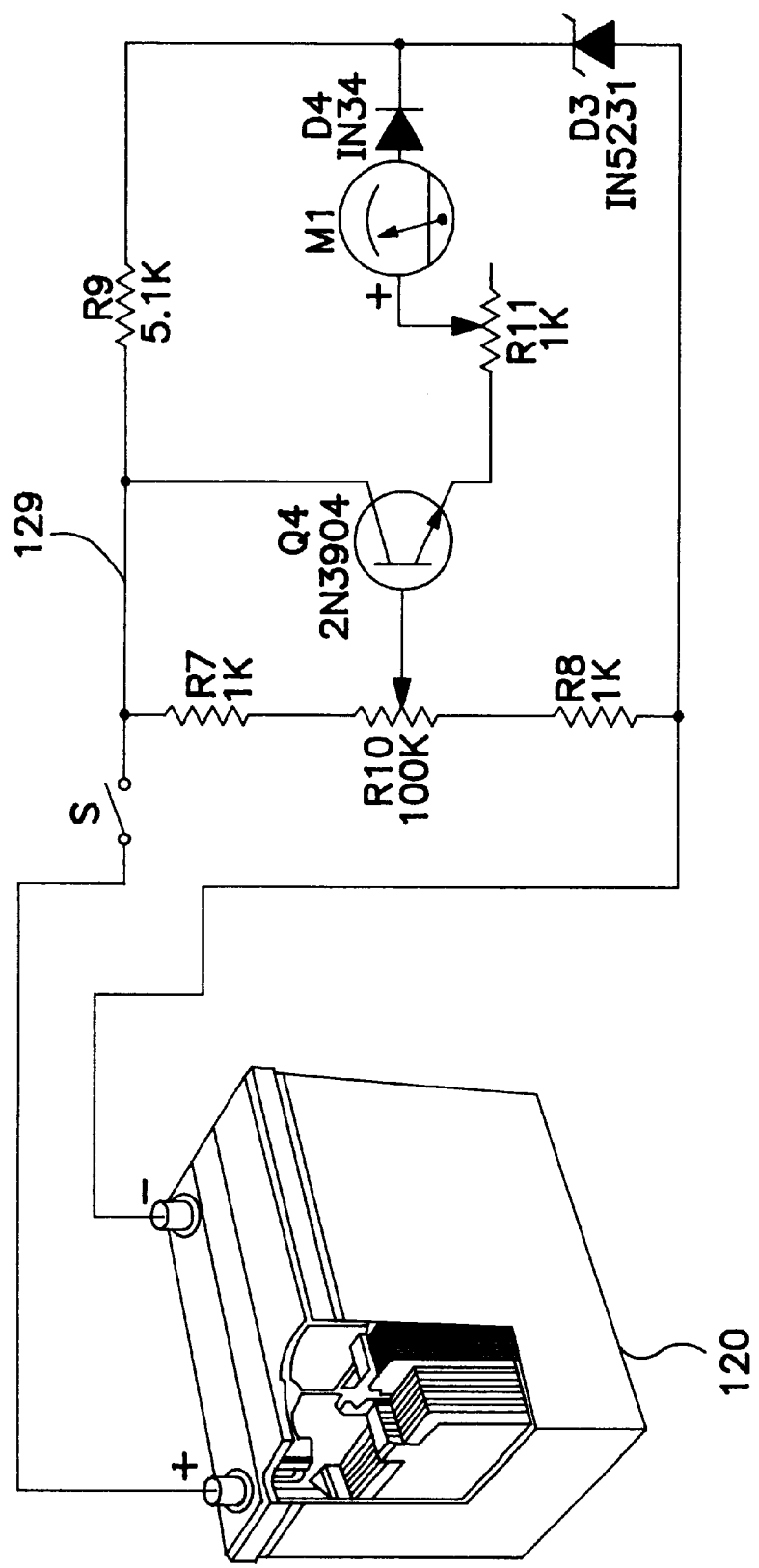
FIG. 5 is a circuit diagram showing an indicator which informs what amount of charge remains in an automobile battery.

With reference to FIG. 5, there is a circuit diagram showing an indicator 129 which informs what amount of charge remains in an automobile battery. Corresponding to this circuit, the indicator is a battery gauge with which the energy remaining in an automobile battery can be measured. Where the charge in the battery is consumed, its terminal potential is decreased. This phenomenon is true of all types of batteries, such as nickel-cadmium (NiCd) cells, lead-acid cells, and nickel-metal-hydride cells, and even the non-rechargable cells, such as alkaline and zinc-carbon cells.

Each of the batteries has its characteristic curve which can be used to examine the percentage of the charged quantity on the basis of the terminal voltage. Since the terminal voltage is changed at a little quantity compared to total voltage of the battery, accuracy and high sensitivity are important factors to the battery gauge. The voltage read from a completely discharged battery is almost the same as that upon charging the battery. For this reason, the circuit of the battery gauge 129 is characterized in that a suppressed-zero method is used to operate a measuring instrument M1. For a fully charged battery, the measuring instrument M1 displays the whole scale. On the other hand, its indicating needle falls down to zero when the battery is completely discharged. Accordingly, the energy retained in the battery can be read on a linear scale of the measuring instrument M1 in which 100%, 50% and 0% are found at the rightmost, the middle, and the leftmost positions, respectively.

Another requirement for the circuit of the battery gauge 129 is that the circuit is designed to draw a current which is a little bit larger than that necessary to move the needle of the measuring instrument M1. If the circuit consumes a large amount of current, it is meaningless to monitor the charged quantities of the battery pack. In the case of measuring the whole charged quantity, the total current necessary for operating the battery gauge is smaller than 2 mA.

Returning to FIG. 5, the circuit comprises a first Zener diode D1 which produces a reference potential necessary for comparing the potential of the battery. This diode has a breakdown voltage of 5.1 volts, which is also useful to most 6- or 7-cell NiCd battery packs as well as 12-volt lead-acid batteries. This circuit can be adapted to a battery of interest by allowing the first Zener diode D1 to have a potential lower by 1 volt than that obtained when the battery pack is completely discharged.

A transistor Q1, which is provided as an emitter-follower amplifier, greatly enhances the sensitivity of the circuit compared to where a resistance R7 is directly connected to a wiper of a resistance R6. This arrangement has another advantage in that the current flowing through resistances R7, R8 and R10 can be reduced. By amplifying the current which flows through the resistors, the resistances can be increased to high values, enabling the whole current drawn to the circuit to be decreased.

The resistance R10 controls the measuring instrument in such a manner that the measuring instrument indicates 0 mA when the battery is completely discharged. On the other hand, when the battery is fully charged, 1 mA can be read from the measuring instrument under the control of the resistance R11.

When the battery gauge is connected to a rear of the battery by chance, a current flows through the third diode D3 and the measuring instrument M1. In the case that the transistor is in a reverse-bias state, a perfect path through which the return to the battery is possible can be provided. In this regard, an excess current is made to flow through the third diode D3, the measuring instrument M1 and a fourth transistor Q4, so as to break them.

Also, the battery gauge 129 comprises a fourth diode D4, a resistance R7, and a resistance R8, in order to prevent a current from flowing when the battery is reversed.

Figure 6:
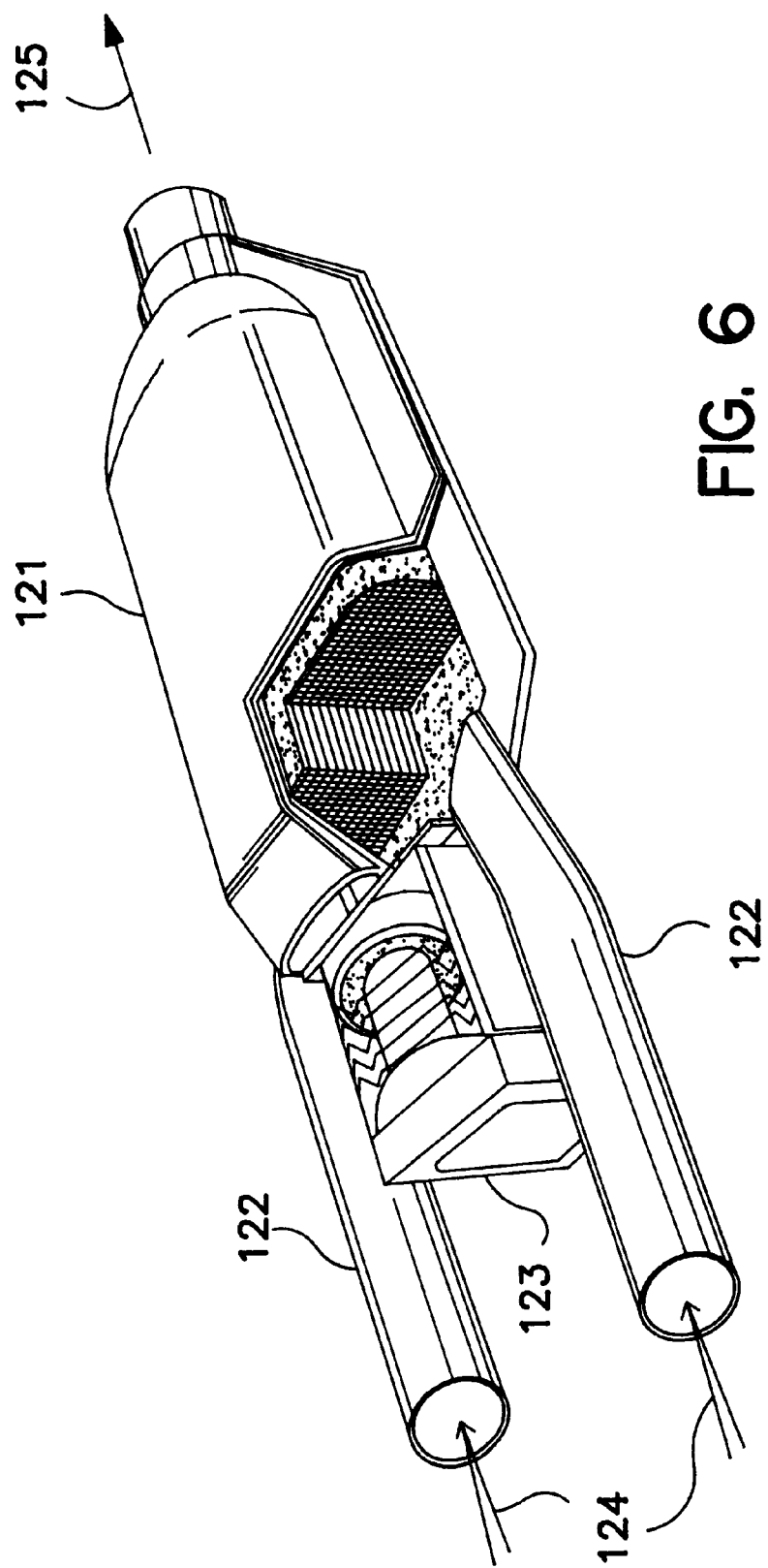
FIG. 6 is a perspective view illustrating the quick-heating catalytic converter according to the present invention.

Referring to FIG. 6, there is an electronic heating catalytic converter assembly, illustrating the core concept of the present invention. As seen, the assembly is composed of a catalytic converter 121 and an electronic heating magnetron 123.

Functionally, the catalytic converter 121 can purify the emissions created by the operation of an internal combustion engine of a vehicle, with an efficiency of 90% at elevated temperatures sufficient for the catalyst to work well. However, at the time the engine starts, the exhaust gas has a temperature of 52° C. (126° F.) which is too cold to enable the catalytic converter 121 to function optimally. Most of the unacceptable emissions or pollutants created by internal combustion engines, even if they were equipped with catalytic converters, occur during cold start operations. These pollutants are emitted for a period of five to ten minutes after cold engine starting, in large part because that is the time period required for the catalyst to reach an efficient operating temperature. Therefore, even though the engine exhaust is flowing through the catalytic converter, until the exhaust heats the catalytic converter to its operating range from emitting start up, the exhaust flow is only slightly catalyzed during that time period.

In the present invention, an electronic heating catalytic converter 123 comprising a magnetron is introduced to electronically heat exhaust 124, thereby allowing the catalytic converter 121 to commence its optimal function within 5 seconds.

As for the catalyst, which alters the velocity of the chemical reaction and may be recovered essentially unaltered in form and amount at the end of the reaction, it is a three-way catalyst which is prepared coating a rare metal mixture of platinum, palladium and rhodium on a monolith made of a fine metal mesh or ceramic honeycomb.

The catalytic converter is located in the exhaust stream of the engine. The converter typically includes a canister holding the three-way converter catalyst monolith that will oxygenate unburned, unacceptable components in the exhaust stream including hydrocarbons, their partially oxidized derivatives such as aldehydes and carbon monoxide, and at the same time reduce nitrogen oxide, after almost stoichiometric fuel burn with oxygen in the cylinders of the engine. The exhaust gas is passed through the catalyst monolith, thereby completing the oxygenation of unburned HC and CO with the aid of the catalysis of platinum and palladium, respectively, and the reduction of $NO_x$ in the exhaust under the cataltytic action of rhodium to convert these unacceptable emissions in the exhaust stream, including unburned hydrocarbons and carbon monoxide, requires an oxidation reaction to destroy them so that they end up as the corresponding oxides, e.g. water and carbon dioxide. On the other hand, $NO_x$ requires a reduction reaction to develop N and $O_2$. In fact, the $O_2$ product of this reduction contributes to the oxidation of the HC and CO in the exhaust.

This monolith may be encased in a stainless steel housing similar in shape to a flat muffler, and firmly fixed in the exhaust pipe. It is typically positioned upstream a muffler and mounted at the underside of a car. It is preferable that the monolith is not arranged at a long distance from an exhaust manifold lest the exhaust should be cooled. In this structure, the exhaust stream flows through the catalytic monolith along the exhaust pipe.

Figure 7:
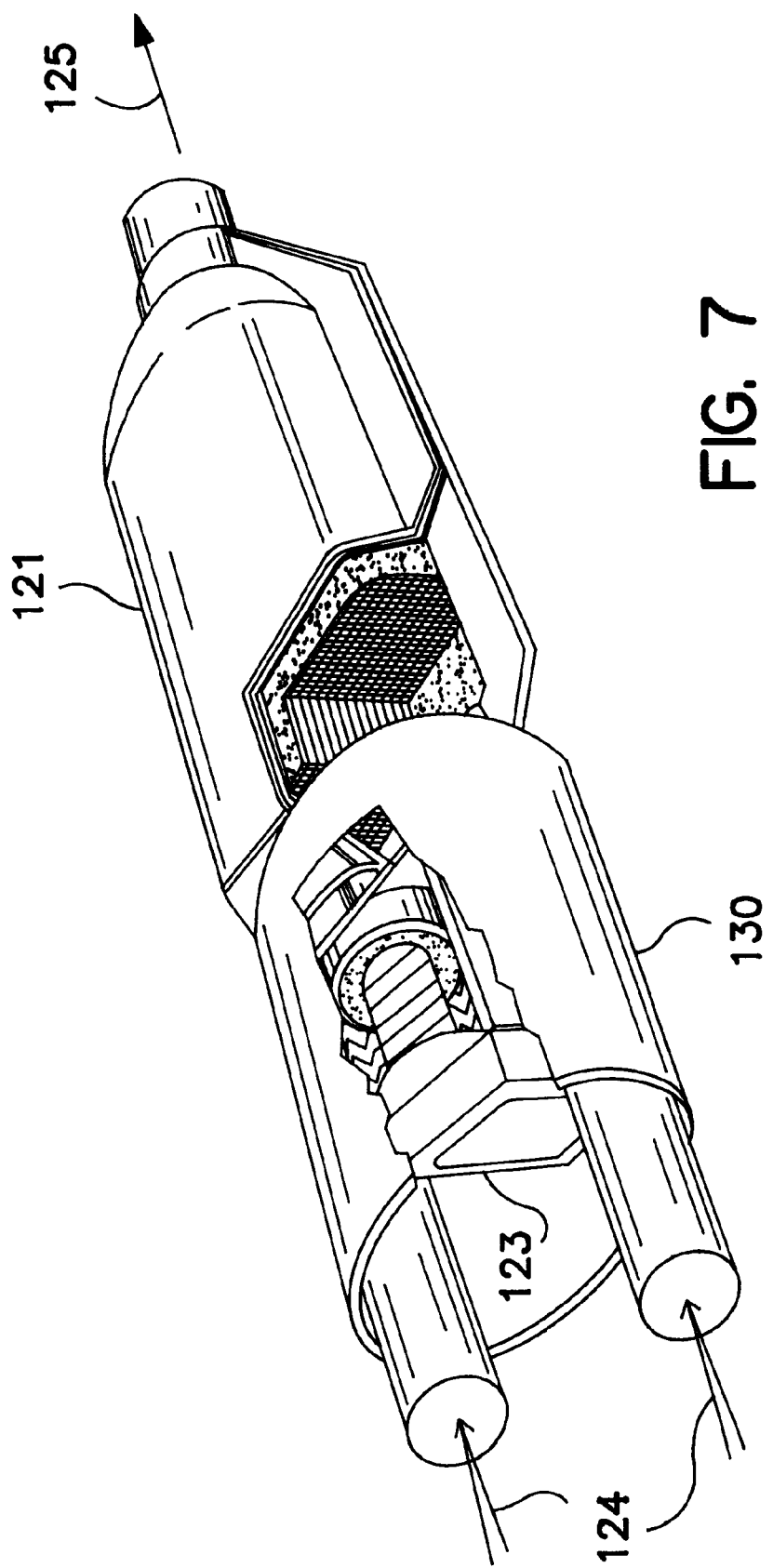
FIG. 7 is a perspective view illustrating an electronic heating catalytic converter encased with a safety cover.

With reference to FIG. 7, the electronic heating catalytic converter 123 is applied with a safety cover 130 which is made of a thermal and electric insulator.

Figure 8:
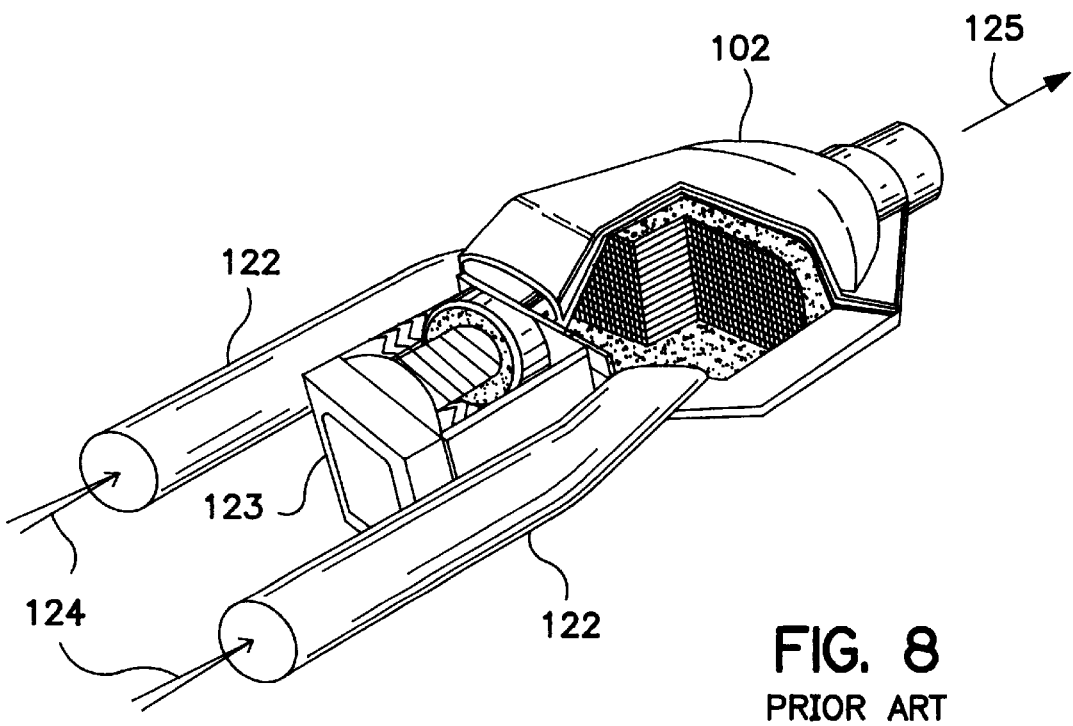
FIG. 8 is a perspective view illustrating the application of an electronic heating catalytic converter of the present invention to a conventional catalytic converter.

Finally, with reference to FIG. 8, there is shown application of the electronic heating catalytic converter to a conventional catalytic converter. As seen, the electronic heating catalytic converter 123 comprising the magnetron according to the present invention can be applied to conventional catalytic converters, so as to purify the emissions created as a result of the almost stoichiometric fuel burn with oxygen in the cylinders of the internal combustion engine.

As described hereinbefore, the present invention allows the exhaust generated just after engine starting to be heated to the temperatures sufficient for the catalyst to function optimally within seconds, thereby safely purifying all of the emissions from cars.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A quick-heating catalytic converter, comprising:
   a catalytic converter system in which exhaust created by the operation of an internal combustion engine is oxidized or reduced to harmless emissions in the presence of a catalyst; and
   an electronic heating catalytic converter system which is located at a front position of the catalytic converter system and preheats the exhaust, comprising:
      a power inverter circuit for inverting a direct current into an alternating current;
      a temperature-controlling circuit for controlling the temperature of the catalytic converter system; and
      a quick microwave heating circuit for quickly increasing the temperature of the catalytic converter within a few seconds to such an extent that the catalyst can readily function to purify the exhaust.

2. The quick-heating catalytic converter as set forth in claim 1, wherein the catalyst is a three-way catalyst.

3. The quick-heating catalytic converter as set forth in claim 1, wherein the quick-heating catalytic converter functions under the control of the signals provided from:
   an oxygen sensor for detecting an oxygen content of the exhaust so as to provide an oxidation atmosphere for effective catalysis before the engine is warmed up;
   an engine PRM sensor for detecting a flow of air and a current, the air being introduced under the influence of the electric signal from the oxygen sensor; and
   a cooling water sensor for detecting a content of cooling water before engine starting.

4. The quick-heating catalytic converter as set forth in claim 1, wherein the catalyst comprises platinum, palladium and rhodium as catalytically effective components and zeolite hydrous aluminum silicate as a support.

5. The quick-heating catalytic converter as set forth in claim 1, wherein the direct current is introduced from a cigarette lighter socket adaptor or an automobile battery to the power inverter circuit and the temperature-controlling circuit automatically changes between an "ON" state and an "OFF" state depending on the temperature of the catalyst.

6. The quick-heating catalytic converter as set forth in claim 1, wherein the quick microwave heating circuit corresponds a magnetron tube which irradiates a radio frequency to the exhaust within a period of a few seconds.

7. The quick-heating catalytic converter as set forth in claim 1, wherein the catalytic converter system and the electronic heating catalytic converter system are integrated in a single module and encased in a safety cover made of a thermal and electric insulator.

8. Use of the electronic heating catalytic converter system of claim 1, in the application for a car equipped with a three-way catalytic converter.

* * * * *